No. 749,512. PATENTED JAN. 12, 1904.
J. W. ANDERSON.
WINDROW ATTACHMENT.
APPLICATION FILED SEPT. 8, 1903.
NO MODEL. 2 SHEETS—SHEET 2.
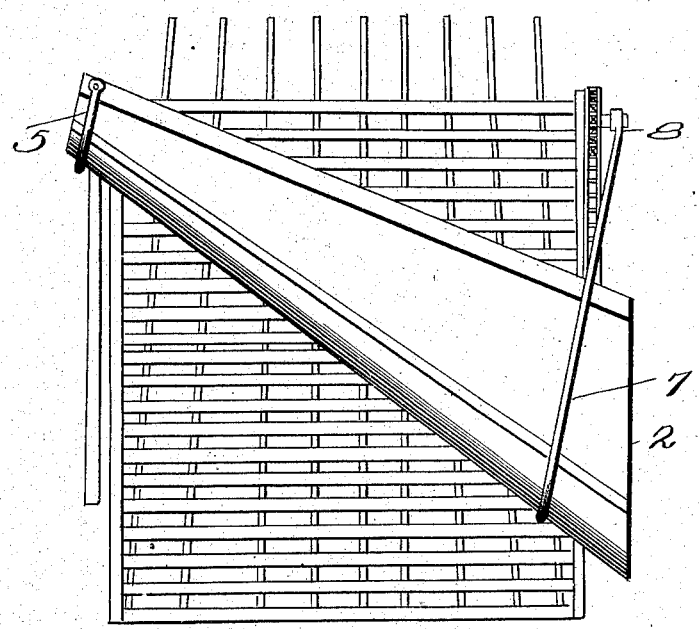
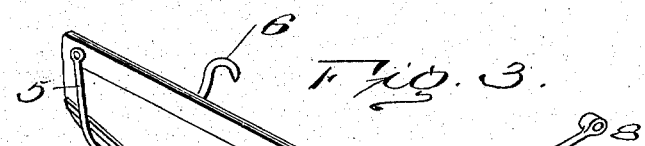
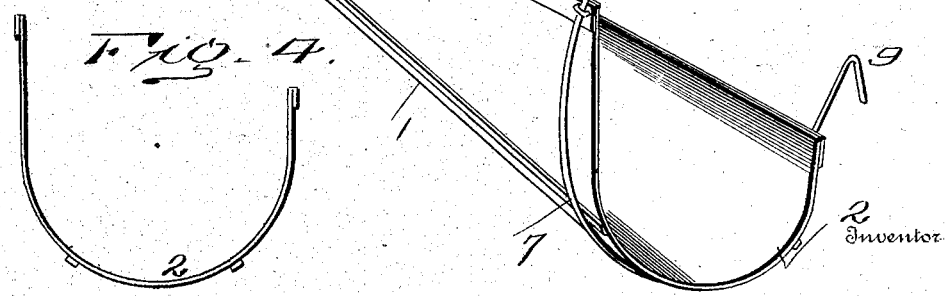

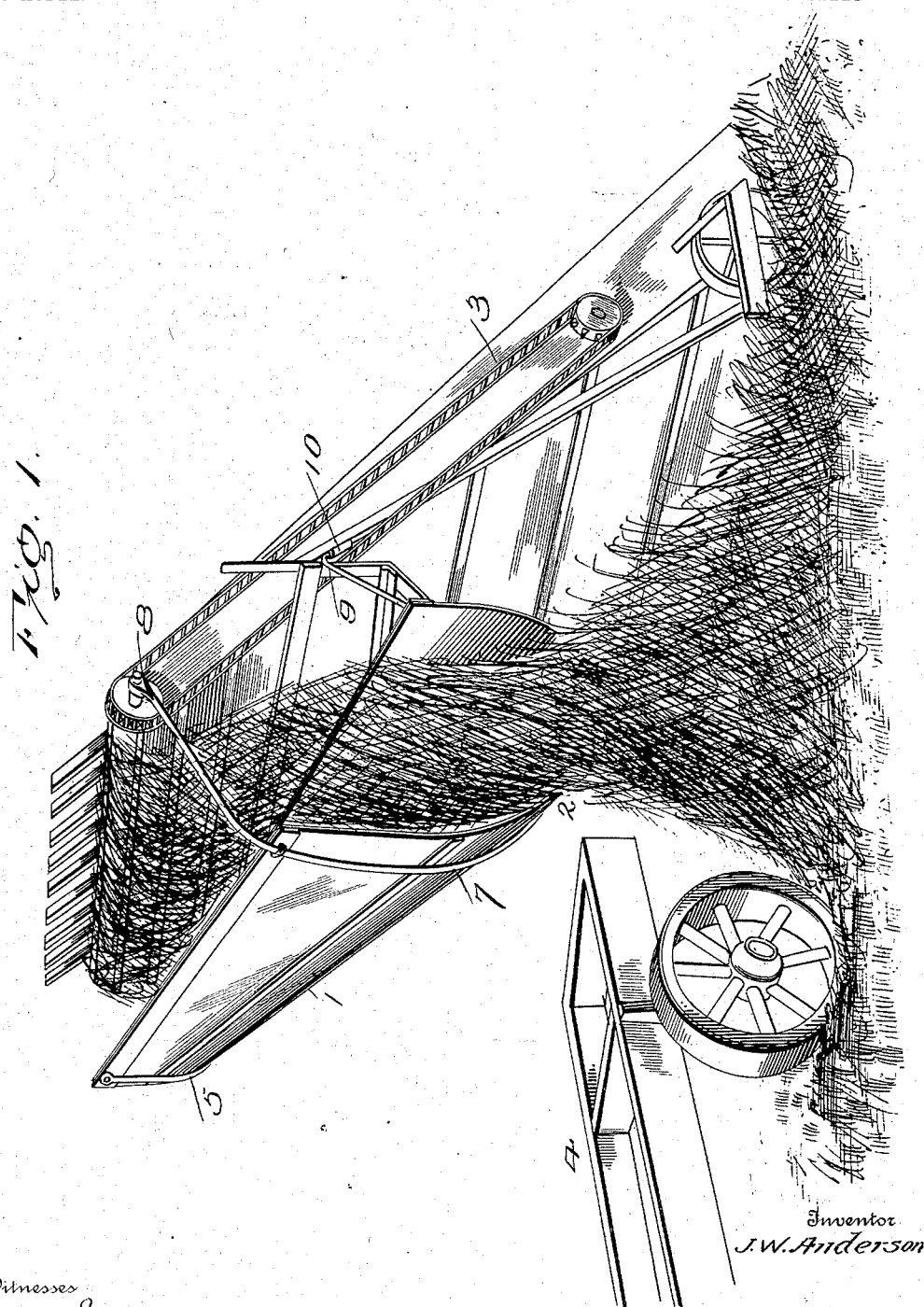

No. 749,512. Patented January 12, 1904.

UNITED STATES PATENT OFFICE.

JOHN W. ANDERSON, OF WERLEY, WISCONSIN.

WINDROW ATTACHMENT.

SPECIFICATION forming part of Letters Patent No. 749,512, dated January 12, 1904.

Application filed September 8, 1903. Serial No. 172,315. (No model.)

*To all whom it may concern:*

Be it known that I, JOHN W. ANDERSON, a citizen of the United States, residing at Werley, in the county of Grant and State of Wisconsin, have invented certain new and useful Improvements in Windrow Attachments, of which the following is a specification.

This invention has for its object to devise a windrow attachment of novel formation for use in connection with a hay-loader of any type, thereby obviating the necessity for providing a special machine for throwing hay or grain into windrows when required to facilitate the drying and curing.

The vital feature of the invention is a windrow device of simple and effective construction and which may be supplied to the agricultural implement at a comparatively small cost and which may be fitted to and disconnected from the hay-loader without the use of tools or the application of special skill.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view showing the application of the invention to a hay-loader of ordinary construction. Fig. 2 is a front view of the hay-loader having the windrow device in position. Fig. 3 is a perspective view of the windrow appliance. Fig. 4 is an end view thereof.

Corresponding and like parts are referred to in the following description and indicated in all the views of the drawings by the same reference characters.

The windrower is of trough form and tapering throughout its length and is located at the delivery end of the elevator or carrier, so as to receive the hay therefrom. When in position, the device inclines transversely from one side of the hay-loader to the other, so as to direct the hay to one side of the loader to form windrows when desired. The higher end is the smaller, and the capacity of the device is such as to make ample provision for receiving and directing the hay transversely of the swath and loader as the latter is drawn over or around the field.

In constructing the attachment any suitable material may be employed, sheet material, such as metal, being preferred, because of its lightness and stiffness and capability of maintaining a given shape. Strips or stays 1 are applied to the windrower 2 and extend lengthwise thereof and are preferably arranged upon the outer side thereof, so as not to interfere with the free movement of the hay in its passage over the device, thereby preventing choking or any obstruction to the ready discharge of the hay. The stiffeners 1 are preferably wooden strips and are riveted or secured to the body of the windrower 2 in any convenient and substantial way.

The hay-loader 3 illustrated may be of any pattern or make and is shown simply to demonstrate the application of the invention. The farm-wagon 4 represents the means generally employed for dragging the loader over the field and for this reason is illustrated in connection with the loader. A metal rod or bar 5 is firmly secured to the smaller end of the device and is adapted to be connected to the hay-loader in any manner and, as shown, is provided with a hook 6 to engage over one end of the journal of the upper roller supporting the endless carrier of the loader. A companion rod or bar 7 is similarly secured to the larger end of the windrower, and its end portions are extended and constructed to make connection with a convenient portion of the hay-loader. As shown, one end of the rod or bar 7 terminates in an eye 8 to be slipped upon the journal of the upper roller of the hay-loader opposite to that receiving the hook 6 of the part 5. The other end of the part 7 terminates in a hook 9 to enter a socket 10, secured to a side of the loader.

From the foregoing it will be understood that the windrower may be readily and quickly applied to the hay-loader without any especial skill or the use of tools, thereby placing within reach of all a simple, cheap, and effective device for windrowing hay or the like when required.

Having thus described the invention, what is claimed as new is—

In combination with a hay-loader, a windrower arranged to receive the material from the elevator and direct it to one side of the machine, said windrower being formed of sheet material and transversely inclined and tapered throughout its length, the delivery end being the larger, longitudinal stays secured to the outer side of the windrower, and rods encircling the end portions of the stays and windrower and attached thereto and connected at their ends to the hay-loader, substantially as described.

In testimony whereof I affix my signature in presence of two witnesses.

JOHN W. ANDERSON.

Witnesses:
F. C. MUFFLEY,
JAMES CORCORAN.